United States Patent [19]

Miller-Ihli

[11] Patent Number: 4,930,898

[45] Date of Patent: Jun. 5, 1990

[54] PROCESS AND APPARATUS FOR DIRECT ULTRASONIC MIXING PRIOR TO ANALYSIS

[75] Inventor: Nancy J. Miller-Ihli, Bowie, Md.

[73] Assignee: The United States of America as represented by the Secretary of Agriculture, Washington, D.C.

[21] Appl. No.: 212,390

[22] Filed: Jun. 27, 1988

[51] Int. Cl.⁵ .......... B01F 11/00; B01F 11/02; G01N 35/04

[52] U.S. Cl. .......... 366/109; 134/1; 366/116; 366/118; 422/50; 422/65

[58] Field of Search .......... 366/109, 116, 117–123, 366/127; 422/50, 63–65, 67, 99; 134/1, 169 R, 184; 310/322, 323, 334; 128/661.08, 662.03

[56] References Cited

U.S. PATENT DOCUMENTS

| | | | |
|---|---|---|---|
| 3,591,862 | 7/1971 | Winston | 366/118 |
| 3,795,358 | 3/1974 | Sarnacki et al. | 134/1 |
| 3,809,372 | 5/1974 | Duthion et al. | 366/119 |
| 3,972,614 | 8/1976 | Johansen et al. | 356/36 |
| 4,046,515 | 9/1977 | de Leeuw | 23/259 |
| 4,052,161 | 10/1977 | Atwood et al. | 23/230 R |
| 4,200,607 | 4/1980 | Suzuki | 422/64 |
| 4,265,544 | 5/1981 | Banno et al. | 356/427 |
| 4,300,833 | 11/1981 | Harnly et al. | 356/307 |
| 4,302,728 | 11/1981 | Nakamura | 366/116 |
| 4,325,910 | 4/1982 | Jordan | 422/64 |
| 4,483,571 | 11/1984 | Mishiro | 310/323 |
| 4,496,244 | 1/1985 | Ludwig | 366/136 |
| 4,528,159 | 7/1985 | Liston | 422/65 |
| 4,602,184 | 7/1986 | Meitzler | 366/127 |
| 4,678,340 | 7/1987 | Boese | 366/111 |
| 4,691,724 | 9/1987 | Garcia et al. | 134/169 R |

FOREIGN PATENT DOCUMENTS

| | | | |
|---|---|---|---|
| 0557826 | 6/1977 | U.S.S.R. | 366/127 |

OTHER PUBLICATIONS

"Vibra-Cell TM" Literature from Sonics and Materials, Inc., Danbury, Conn., 3/1986, three pages.

"This is Paramax TM" literature from American Dade Div. of Am. Hosp. Supply Corp., Miami, Fla., 7/1983.

Bio/Separations Catalogue published by Kontes, Vineland, N.J., Nov. 1986, No. 5, p. 29.

Miller-Ihli, N.J. Sample Preparation and Presentation for Simultaneous Multi-Element GEAAS. 35th Annual Pittsburgh Conf. on Analytical Chem. and Applied Spectroscopy, Atlantic City, N.J., Mar. 1984.

Miller-Ihli, N.J. Simultaneous Multielement GFAAS Analysis of Slurries. Federation of Analytical Chem. and Spectroscopy Societies, Philadelphia, Pa., Sep. 16–21, 1984.

Miller-Ihli, N.J. Slurry Sample Preparation for Simultaneous Multielement AAS. Federation of Analytical Chem. and Spectroscopy Societies, Philadelphia, Pa., Sep. 29–Oct. 4, 1985.

Miller-Ihli, N.J. Multielement GFAAS. 1985 Congress on Advances in Spectroscopy and Lab. Science, Toronto, Ontario, Canada, Oct. 1985.

Miller-Ihli, N.J. Simultaneous Multielement Determinations Using Graphite Furnace Atomization. 69th Canadian Chemical Conference, Saskatoon, Saskatchewan, Canada, Jun. 1–4, 1986.

Miller-Ihli, N.J. Slurry Sample Preparation for Atomic Absorption Spectroscopy Federation of Analytical Chemistry and Spectroscopy Societies, St. Louis, Mo., Sep. 28–Oct. 3, 1986.

Miller-Ihli, N.J. Multielement GAAS Analysis of Solids and Slurries. Congress on Advances in Spectroscopy and Laboratory Science, Toronto, Ontario, Canada, Oct. 6–9, 1986.

Miller-Ihli, N.J. Sample Preparation Methods for Multielement AAS. XXV Colloquium Spectroscopicum Internationale, Toronto, Ontario, Canada, Jun. 21–25, 1987.

*Primary Examiner*—Timothy F. Simone
*Attorney, Agent, or Firm*—David R. Sadowski; M. Howard Silverstein

[57] ABSTRACT

The instant invention is drawn to an apparatus and process for, direct ultrasonic mixing of a sample by use of an ultrasonic probe, in combination with sample conveying and/or sample analysis, thereby providing: convenient automated flexible sample preparation (e.g. mixing), conveying and/or analysis; and/or greater accuracy and precision of analysis than was previously achievable.

21 Claims, 2 Drawing Sheets

PROCESS AND APPARATUS FOR DIRECT ULTRASONIC MIXING PRIOR TO ANALYSIS

BACKGROUND OF THE INVENTION (1) Field of the Invention

The present invention relates generally to highly advantageous use of direct ultrasonic mixing of a sample in combination with, sample conveying and/or sample analysis.

(2) Description of the Prior Art

Prior art processes of preparation of solid samples for analysis (e.g. graphite furnace atomic absorption spectrometry (GFAAS) analysis) such as wet ashing (as for example described by Wolf, W. R. in "Human Nutrition Research, Beltsville Symposia in Agricultural Research", Allanheld, Osmun and Co., Totowa, N.J., 1981, Vol. 4, pp. 175-196) or dry ashing, have suffered from many drawbacks and disadvantages. Those prior art sample preparation techniques requiring digestion of the solid sample (such as "wet ashing", as for example by use of an oxident e.g. an oxidizing acid or peroxide) suffer from the disadvantages of: requiring a long period of time for digestion of the sample, possibility of losing the analyte through volatilization prior to analysis, loss of analyte due to its retention in insoluble residue, and the possibility of contaminating the sample. Direct analysis of solids by insertion directly into the graphite furnace suffers from the disadvantage of requiring very small sample sizes (sub milligram) which necessitate special weighing and sampling procedures, etc..

U.S. Pat. No. 4,528,159 (Jul. 9, 1985) to Liston discloses an automated analysis device, utilizing an ultrasonic horn (disposed in a water bath so that the water conducts the ultrasonic energy from the horn to the samples) utilized to break up and dissolve reagent tablets. Devices utilizing such an indirect mechanism for mixing may suffer from several drawbacks: (1) the ultrasonic energy from said horn may be dissipated by the water bath so that the samples are not adequately mixed; (2) such devices do not provide means for localizing the ultrasonic energy; (3) the ultrasonic energy may heat the water to an unacceptably high temperature and thereby necessitate cooling of the water bath to avoid overheating of the device. The Liston patent does not contemplate, direct ultrasonic mixing of samples, or using ultrasonics to mix a slurry or maintain a suspension of particles, or automated operation as utilized in the present invention.

SUMMARY OF THE INVENTION

The present invention avoids the above mentioned disadvantages of the prior art by: utilization of direct ultrasonic mixing of samples, and; permitting direct analysis of solid sample, by slurrying the solid sample in liquid and maintaining a uniform suspension (i.e. slurry) of small particles of the solid sample, using direct mixing with an ultrasonic probe inserted directly into the sample. One embodiment of the present invention provides automated sample preparation (e.g. mixing), conveying, and analysis thereby facilitating convenient analysis of a large number of samples. It has unexpectedly been discovered that the direct mixing of a sample with an ultrasonic probe of the present invention, provides more effective mixing (and thereby provides more accurate and precise analysis) than other types of mixing, such as vortex mixing, indirect ultrasonic mixing, bubble mixing, etc..

Objects of the instant invention, which may be achieved additively or alternatively, include:

providing direct ultrasonic mixing of samples (e.g. suspensions or slurries) such as biological, geological, agricultural, or clinical samples;

permitting direct analysis of solid samples prepared as slurries or suspensions thereby, reducing the probability of sample contamination, and reducing sample preparation time (as compared with conventional wet/dry ashing methods);

avoiding the generating of undesirable fumes which may occur with sample digestion;

maintaining a uniform suspension or slurry of small particles;

permitting minimum sample handling thereby providing both ease of sample handling and minimizing of the probability of sample contamination;

providing the ability to dilute samples as desired;

eliminating the need for weighing small quantities of samples and reagents;

automating the sample preparation (e.g. mixing), conveying and analysis so as to avoid the need to manually manipulate any of the components used in the present invention;

permitting sample preparation and mixing directly in a sample container which permits mixing up to the time the sample is conducted from the container to the analyzer, thereby avoiding settling or inhomogeneity of the sample e.g. suspension;

providing the ability to calibrate against aqueous standards when using graphite furnace technology;

reducing the probability of loss of analyte by volatilization prior to analysis;

providing the ability to prepare samples and separate therefrom, a subsample or subsamples, which is/are completely representative of said sample;

aiding in the extraction of analytes into the liquid fraction of a sample slurry or suspension thereby stabilizing the sample and improving precision;

reducing the probability of analytical results which are biased low due to retention of analyte by insoluble residues;

permitting analysis of any amount of sample including very small quantities of sample;

providing the ability to prepare samples well in advance of analysis;

providing the highly advantageous combination of ultrasonic mixing combined with sample conveying means, such as an autosampler;

providing the highly advantageous combination of ultrasonic mixing combined with an analyzer (for example, atomic or molecular spectrometer analyzers, such as graphite furnace atomic absorption spectrometer analyzers, i.e. GFAAS, graphite furnace atomic emission spectrometer analyzers i.e. GFAES, etc.).

These and other objects of the instant invention, which will become readily apparent from the ensuing description, are accomplished by:

a highly advantageous apparatus for preparing, conveying and analyzing a sample (i.e. at least one sample) which comprises, analyzer means for analyzing a sample (the present invention may advantageously be utilized with a wide variety of analyzers), ultrasonic probe means for imparting ultrasonic energy to a sample so as to mix the sample, and conveying means (which may for example be an autosampler) operatively associated with the analyzer means and ultrasonic probe means for conveying the sample from direct contact with said ultrasonic probe means to said analyzer;

an apparatus for preparing and conveying a sample (i.e. at least one sample) comprising, sample conveying means (which may for example be an autosampler) for conveying at least one sample, the sample conveying means including means providing electrical signals, ultrasonic probe means for direct insertion into, and ultrasonic mixing of, said at least one sample, and control means electronically connected to the sample conveying means and the ultrasonic probe means for receiving the electrical signals (produced by the sample conveying means) from the sample conveying means and controlling the ultrasonic probe (e.g. controlling positioning and vibration) in response to said electrical signals e.g. so that signals provided by the sample conveying means are utilized to control operation of the mixing and conveying;

a process for preparation (e.g. mixing) and analysis of a sample (i.e. at least one sample) comprising, mixing a sample which is comprised of solid and liquid by imparting to said sample ultrasonic agitation from an ultrasonic probe positioned directly in (e.g. having been directly inserted into) said sample, and analyzing said sample subsequent to the mixing with the ultrasonic probe; and a process for mixing and conveying of a sample comprising, mixing a sample (i.e. one or more samples) by imparting to the sample ultrasonic energy from an ultrasonic probe positioned directly in the sample and thereby producing a mixed sample, conveying the mixed sample with conveying means which provides electrical signals, and controlling said mixing in response to said electrical signals provided by said conveying means.

DESCRIPTION OF THE PREFERRED EMBODIMENTS

Figure 1:
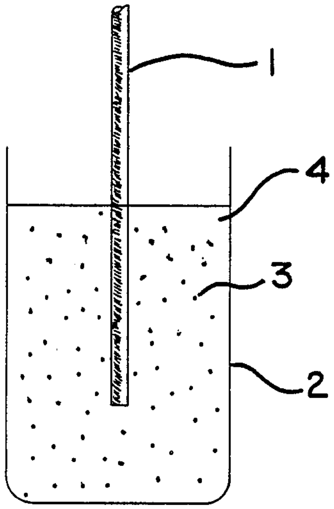
FIG. 1 is a cross-sectional side view of a first embodiment of the present invention.

FIG. 1 illustrates a first embodiment of the present invention, including an ultrasonic probe means designated 1, at least a portion of which is inserted directly into a sample holding container 2, and thereby in direct contact with the sample. The type, composition, or configuration (e.g. cylindrical, stepped, tapered, etc.) of ultrasonic probe is not critical to the present invention, however the following ultrasonic devices are exemplary: RAI/Electromation 10 watt unit, Model 881440-4000 with a 4½ inch long tapered probe assembly, which is approximately 122 mm long when installed (tapering to a minimum diameter of 2 mm); Sonics and Materials, Inc. of Danbury, Conn., Model VC40, 40 watt VIBRA-CELL TM Ultrasonic Processor with a 6 inch (approximately 153 mm) tapered probe, tapering to a minimum diameter of approximately 2.5 mm. Although the ultrasonic probe may be of any composition, and may be coated or covered with inert material, it has been found to be desirable when conducting analysis for metal, to utilize an ultrasonic probe made of titanium or titanium alloy, as such material does not contaminate the sample for most metals of interest. Use of such an ultrasonic probe lends itself to automated mixing and use with small volume sample holders (e.g. autosampler cups may be approximately 1 ml). Also, the type, composition, or configuration of the sample holding container 2 is not critical to the present invention, and may include for example: a tube (e.g. culture or test tube), a vial, a cuvette, a cell, an autosampler cup which is either conical or rounded at the bottom, etc.. While sample containers of any composition (e.g. plastic (such as polypropylene, polystyrene, etc.), quartz, glass, etc.) may be utilized in the present invention, sample containers (e.g. autosampler cups) of TEFLON TM have been found to be particularly resistant to contamination of the sample. It is desirable that the ultrasonic probe not touch the sample container, particularly if the sample container is made of material other than TEFLON TM (e.g. polystyrene) in order to reduce the probability of possible contamination of the sample as a result of disassociation of material from the sample cup.

The ultrasonic probe means 1 vibrates ultrasonically, thereby imparting ultrasonic energy to the sample which provides thorough and uniform mixing of the sample, yielding a homogeneous mixture (e.g. homogeneous solution, slurry, suspension, dispersion, etc.). While for purposes of illustration, the sample is shown as including, both solid particles 3 and liquid phase 4 because the present invention may be utilized to great advantage with such samples (e.g. liquid containing powdered sample to be analyzed, blood, urine, etc.), the direct ultrasonic mixing of the present invention may be practiced with any type of sample (for example, biological, geological, agricultural or clinical samples, including samples which consist, or consist essentially, of liquid i.e. when the sample to be analyzed is liquid or dissolved in liquid, etc.). When it is desired to provide a liquid carrier for solid sample to be analyzed, the liquid phase may be any liquid suitable to serve as a carrier for solid sample particles, which liquid does not interfere with the analysis. Examples of materials which may be included in the liquid phase are: water, acids (such as dilute nitric acid), bases, matrix modifiers, surfactants, agents which aid in solubilizing the sample, glycerol, TRITON X-100 TM (a wetting agent, Rohm and Hass, registered trademark for octyl phenoxy polyethoxyethanol), magnesium nitrate, hydrofluoric acid, etc.. According to the present invention, a slurry preparation may typically be prepared by weighing 10 milligrams of solid sample (e.g. in powdered form) into a polypropylene test tube and adding 5 to 10 milliliters of dilute (5% by volume) nitric acid and of TRITON X-100 TM to provide 0.04% by volume. Although the present invention may be utilized to prepare samples from as little as 5 to 10 milligrams of homogenous material, the amount of sample and the final sample concentration may vary widely depending on the volume and concentration desired for the analysis. Slurry preparations are mixed, to avoid settling of the sample, and to insure that when a subsample is drawn said subsample is representative of the entire sample. Other types of mixing may be utilized in combination with the direct ultrasonic mixing of the present invention (e.g. vortex mixing may be utilized prior to the ultrasonic mixing). Direct ultrasonic mixing of the instant invention provides greatly reduced slurry preparation time, e.g. preparation time of less than two minutes. A clear indication of the advantageousness of the present invention, is that analysis of slurries with direct ultrasonic mixing typically provides only a 1–3% degradation in precision compared to analysis of aqueous standards with similar elemental concentrations.

Figure 2:
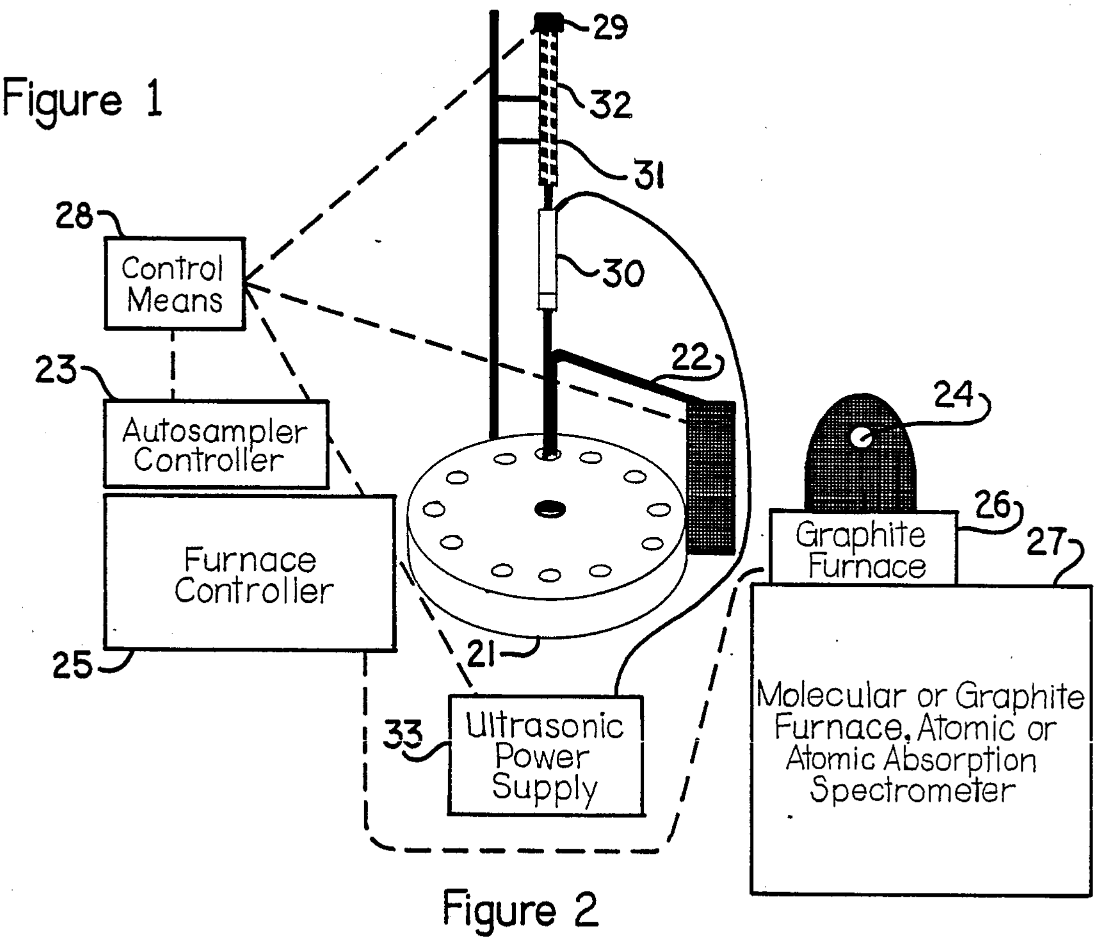
FIG. 2 is a schematic diagram of an embodiment of the present invention which provides automated sample mixing and conveying to an analyzer.
Figure 3:
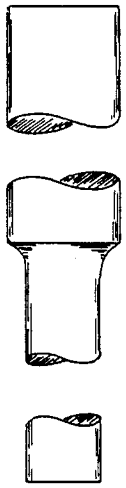
FIG. 3 is a side view of an illustrative ultrasonic probe of stepped configuration useable in the present invention.
Figure 4:
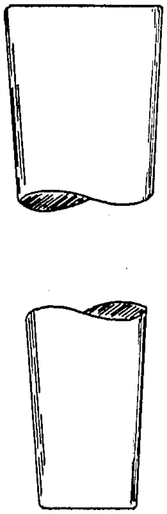
FIG. 4 is a side view of an illustrative ultrasonic probe of tapered configuration useable in the present invention.
Figure 5:
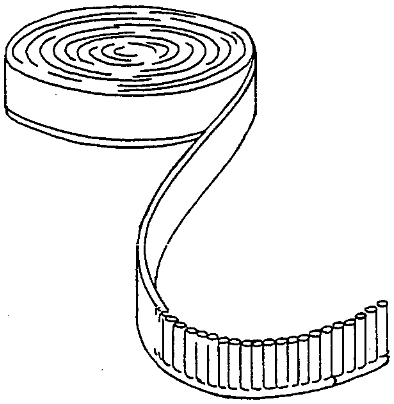
FIG. 5 shows a moveable belt sample conveying means useable in the present invention.

FIG. 2 illustrates an embodiment of the present invention which provides automated sample mixing and conveying. The dashed lines in FIG. 2 represent electrical connections. FIG. 2 shows a conventional autosampler tray (i.e. turntable) 21 which holds a plurality of samples in autosampler cups, and is provided with means to rotate the tray in order to move each of said autosampler cups (each of which may contain a sample) under the autosampler arm 22, so that said autosampler arm may draw at least a portion of the sample from an autosampler cup and swing to convey it to the graphite furnace tube 24. Although a circular autosampler tray is shown in FIG. 2 for purposes of illustration only, it should be understood that any means (e.g. moving conveyor, rack, band, tape, belt, etc. e.g. such as that taught in U.S. Pat. No. 4,528,159 issued 7/9/85 to Liston) for conveying samples may be utilized. In conventional prior art devices, autosampler control means 23 controls movement of the autosampler tray and autosampler arm as well as the volume of sample withdrawn and the number of replicates. An example of a commercially available prior art, autosampler which includes such autosampler control means, tray and arm is, the AS-40 autosampler available from Perkin-Elmer Corp., Norwalk, Conn. Such an autosampler includes autosampler control means which normally generates electrical signals which are usually utilized to control operation of the electrically operated autosampler components (e.g. auto sampler tray, arm, means for pipetting the sample from the sample holder, means for discharging sample into the analyzer, etc.); however the present invention, in one of its novel and highly inventive aspects, utilizes these electrical signals to provide automatic sample preparation (e.g. mixing) and conveying by means of control means 28. The use of electrical signals provided by the autosampler control provides a highly convenient, and readily useable, means for coordinating operation of all the electrically operated components.

Although FIG. 2 shows for purposes of illustration only convention testing equipment including: furnace controller 25, graphite furnace 26, graphite furnace tube 24 and atomic absorption spectrometer 27; it should be understood that the present invention may be advantageously utilized with any type of analyzer (e.g. atomic or molecular spectrometers, for example graphite furnace atomic absorption or emission spectrometers, etc.). FIG. 2 also shows an ultrasonic probe 30 which is vertically moveable (i.e. reciprocatable) by virtue of connection to a probe moving means e.g. cylinder 31 (e.g. a pneumatic or hydraulic cylinder, for example a Clippard Minimatic cylinder). Valve 29 (which may for example be a Clippard Electronic valve) controls the passage of fluid (e.g. gas or liquid) into the cylinder 31 in order to push at least a portion of the ultrasonic probe 30 down into an autosampler cup. A coil spring 32 provides upward force to direct the probe 30 upwardly out of said autosampler cup when fluid pressure within the cylinder 31 is released by opening of valve 29. Also, conventional means (including a rinse basin), not shown, are provided for rinsing the autosampler arm 22 and ultrasonic probe 30, so as not to contaminate samples with portions of the previous samples which might adhere to the arm or probe. As illustrated in FIG. 2, control means (e.g. electronic logic circuitry) 28 receives electrical signals from autosampler controller 23. The control means 28 produces electronic signals which control: valve 29; autosampler arm 22; turning on and off, or tuning of, ultrasonic power supply 33 (and whatever means are utilized in combination with the probe to provide ultrasonic energy); so as to automatically mix and convey samples to the analyzer. The following is a typical sequence of events: (1) the autosampler starts its normal rinse cycle, coincident with the autosampler arm coming up out of the rinse, a signal is produced by the autosampler controller 23 which signals the control means 28 which activates the valve 29 allowing fluid into the cylinder 31 thereby driving the ultrasonic probe down into the sample within an autosampler cup; (2) the same control means signal is used to trigger a timer (e.g. a 30 second timer) which interrupts the autosampler arm (e.g. for 30 seconds) and turns on the ultrasonic power unit 33 (e.g. for 30 seconds); (3) at the end of step 2 control means 28 turns off the ultrasonic agitation and opens valve 29 whereby the cylinder 31 is vented, so that spring 32 lifts the ultrasonic probe 30 from the autosampler cup; (4) the autosampler arm 22 continues its normal routine, and as the ultrasonic probe is lifted the autosampler arm 22 is directed toward the autosampler cup, the autosampler arm enters the autosampler cup and removes an aliquot of well mixed sample (e.g. slurry) and injects it into the furnace tube 24; (5) the autosampler controller signals movement of the tray so that the next sample cup is brought into position; (6) the autosampler arm is signaled to return to the rinse basin; (7) means for directing the ultrasonic probe 30 into the rinse basin are activated in order to rinse off the probe; (8) the ultrasonic probe is raised, the autosampler pumps finish rinsing liquid and the device is now ready for the next sample. Constructing of specific control means 28 (e.g. logic circuitry) to be utilized in the present invention is within ordinary skill i.e. once having been taught by the above description of my invention: (1) the advantageousness of direct ultrasonic mixing and operation thereof as set forth herein; (2) that electronic signals from an autosampler controller may be used to control operation of the ultrasonic mixing and other automated operations, and; (3) the sequence of automated operations as described above; one of ordinary skill in the art would be capable of constructing specific logic circuitry to be utilized in the present invention.

The foregoing detailed descriptions are given merely for purposes of illustration. Modifications and variations may be made therein without departing from the spirit and scope of the invention.

The following examples are intended only to further illustrate the invention and are not intended to limit the scope of the invention which is defined by the claims.

EXAMPLES

All determinations were made on the SIMAAC system, a prototype multielement atomic absorption spectrometer, which is described in Harnly, J. M., Miller-Ihli, N. J. and O'Haver, T. C. Spectrochim Acta, Part B, 1984, 39,305, and U.S. Pat. No. 4,300,833 issued 11/17/81 to Harnly et al. Briefly, the system consists of a 300-W Cermax lamp, a graphite furnace atomizer, an echelle polychromator modified for wavelength modulation, photomultiplier tubes as detectors and a computerized data acquisition, manipulation and reporting system. This spectrometer features simultaneous determination of up to 16 elements, detection limits similar to line-source AAS for most elements, wavelength modulation for background correction, an extended analytical range covering 5–7 orders of magnitude of concentration, automated sample introduction and computerized high speed (18 KHz) data acquisition.

The spectrometer was equipped with an HGA-500 graphite furnace atomizer (Perkin-Elmer, Norwalk, Conn., USA). A typical furnace program appears in Table 1.

TABLE 1

HGA-500 furnace parameters for simultaneous multielement GFAAS determinations

| Step | Temperature(°C.) | Ramp[1] (time in seconds) | Hold[2] (time in seconds) |
|---|---|---|---|
| Dry | 170 | 20 | 30 |
| Char | 500 | 20 | 20 |
| Atomise* | 2700 | 0 | 10 |
| Clean-out | 2700 | 1 | 5 |
| Cool down | 20 | 1 | 10 |

*Ar flow, 20 ml $min^{-1}$

[1]"Ramp" refers to the time during which the temperature was increased at a constant rate (i.e. a plot of temperature v.s. time yields a "ramp") from, ambient temperature or the temperature of the previous step, to the temperature in the first column.

[2]"Hold" refers to the time the temperature was held during each step.

Argon was used as the purge gas. The charring temperature (500° C.) was selected to prevent the premature volatilization of Pb and Zn. The compromise atomization temperature of 2700° C. was based on the atomization requirements of the less volatile elements. Elements determined included: Al (309.3 nm); Ca (239.9 nm); Cr (357.9 nm); Cu (324.8 nm); Fe (248.3 nm); Mg (285.2 nm); Mn (279.5 nm); Mo (313.2 nm); Ni (232.0 nm); Pb (283.3 nm); and Zn (213.9 nm). The furnace was equipped with an AS-40 autosampler (Perkin-Elmer). In most instances 20 microliter volumes were used for both samples and standards. A dilute $HNO_3$ rinse was used for the autosampler to prevent carry-over contamination from one sample to the next. Pyrolytically coated graphite tubes (Perkin-Elmer) and platform atomization were used for all the work, and both integrated absorbances (peak areas) and peak-height measurements were recorded.

Ultrapure reagents were used throughout. The nitric acid used to prepare the slurries and aqueous calibration standards was sub-boiling distilled nitric acid from the National Bureau of Standards (NBS, Gaithersburg, Md., USA). Water used throughout was 18 megaohm de-ionized distilled water (Millipore, Bedford, Mass., USA).

Multi-element standards were prepared daily in 5% $HNO_3$ and contained Al, Ca, Cu, Cr, Fe, Mg, Mn, Mo, Ni, Pb, V and Zn. Standards contained equal concentrations of each of the elements and a total of eight standards were used to cover over three orders of magnitude of concentration range (1.0, 5.0, 10.0, 50.0, 100, 500, 1000, 5000 ng $ml^{-1}$).

Slurries were prepared by weighing approximately 10 milligrams of a finely powdered homogeneous material into a clean polypropylene tube using a Mettler Model HE20 Balance (Highstown, N.J., USA). The NBS standard reference materials analyzed were used as received and were not subjected to any additional grinding or sieving. It should be noted that most of the materials analyzed were reported by NBS as being sieved through 40 mesh (<425 micrometer) or 60 mesh (<250 micrometer) sieves. A solution of 5 ml of 5% by volume $HNO_3$ containing Triton X-100 (final concentration 0.04% by volume) was added to the solid sample. The slurry was mixed well in preparation for analysis by GFAAS.

To ensure accurate determinations it was essential that slurry preparations be mixed well when removing a representative 20 microliter portion for analysis by GFAAS. This was accomplished by placing well mixed representative slurry sub-samples (500 microliter) into clean autosampler cups and then to mix the samples on the autosampler tray by inserting the titanium ultrasonic probe of a Kontes micro-ultrasonic cell disrupter (Kontes, Vineland, N.J., currently available as Model 881440-4000 by RAI/Electromation) into the cup and mixing thoroughly until the autosampler withdrew an aliquot for injection into the furnace. The autosampler was used to dispense samples into the furnace in all instances because it provides significantly better precision than can be obtained by hand pipetting. Materials analyzed during the course of this research included National Bureau of Standards (NBS) Standard Reference Materials (SRM): bovine liver (SRM 1577a); citrus leaves (SRM 1572); coal (SRM 1632a); orchard leaves (SRM 1571); pine needles (SRM 1575); rice flour (SRM 1568); spinach leaves (SRM 1570); tomato leaves (SRM 1573); and wheat flour (SRM 1567). Also NBS reference material mixed diet (RM 8431) was analyzed. Moisture determinations were made by drying 0.5–1.0 gram samples in a vacuum oven at 100° C. overnight. Dry mass concentrations were then calculated using a moisture correction factor.

It was found that the probe itself did not contaminate samples. Sample cups of polystyrene and TEFLON TM were utilized. One practical advantage of mixing with the ultrasonic probe is that an autosampler cup can be filled once with 500–1000 microliters of slurry and many 20 microliter replicate samples can be withdrawn for injection into the furnace. However, this does require that a representative, very well mixed sample be placed in the autosampler cup at the start and it requires a rinsing scheme for the ultrasonic probe to avoid contamination.

COMPARATIVE EXAMPLE 1:

Table 2 contains data comparing Fe concentrations resulting from slurry analyses (using the above described techniques) of NBS wheat flour (SRM 1567) and NBS bovine liver (SRM 1577a) which utilized vortex mixing and ultrasonic probe mixing. In every instance, the same pool of slurry was analyzed using both mixing methods. The results for Fe in these materials are much more accurate when ultrasonic probe mixing is used. Vortex slurry mixing provided consistently low, unsatisfactory values for Fe in wheat flour and other materials. The poorer results for the vortex mixing were undoubtedly due to the fact that a portion of the Fe was associated with large particles which repeatedly settled out of suspension before the autosampler could remove a representative subsample. The ultrasonic probe mixing method does not afford opportunity for solids to settle out. In addition, the ultrasonic action physically disrupts the solids, making them more flocculent and tending to keep them in suspension longer and increasing the amount of Fe extracted into the liquid ($HNO_3$)

fraction of the slurry. For this reason, an automated ultrasonic mixer would appear to be the mixing method of choice for automated, routine slurry preparations.

TABLE 2

Vortex versus ultrasonic probe mixing for the determination of Fe in NBS standard reference materials
Fe concentration (microgram/gram)

| Material | Vortex Mixing | Ultrasonic probe mixing | Certified Concentration |
|---|---|---|---|
| Wheat Flour, NBS SRM 1567 | 7.0 to 13.5 | 18.9 ± 0.6 | 18.3 ± 1.0 |
| Bovine liver, NBS SRM 1577a | 91 to 113 | 210 ± 16 | 194 ± 20 |

COMPARATIVE EXAMPLE 2

Performance of a prior art mixing device employing an ultrasonic mixing device external to the sample cup (i.e. providing indirect ultrasonic mixing of the sample) was evaluated. Said prior art mixing device was a prototype indirect ultrasonic mixing tray accessory for the AS-40 autosampler (Perkin-Elmer) which included a stainless-steel container with water inlets and outlets which replaces the conventional AS-40 plastic container in which the tray rests. The prior art indirect ultrasonic mixing device is located under the container directly adjacent to the autosampler arm. Cooling water is recirculated through the container, and the unit is designed such that when the power is on, indirect ultrasonic agitation conducted through the water bath will provide mixing for the sample cup in position for sample withdrawal. The prior art automatic ultrasonic unit can be used in the continuous mode or it can be triggered from the HGA-500 furnace power supply to start mixing at the start of the autosampler rinse and to continue through sample withdrawal (approx. 11 seconds). A blank study using TEFLON TM autosampler cups and up to 60 seconds of continuous agitation produced no measurable blanks for Mn, Fe, Cu, Pb, Cr or Al. A slurry of NBS spinach leaves (SRM 1570) was used to evaluate the precision obtainable with this agitation method. A well mixed 1 milliliter aliquot of slurry was placed in a TEFLON TM autosampler cup and the mixer was operated in the continuous mode providing constant agitation for 30 minutes during which time the samples were continuously withdrawn and analyzed. The resulting integrated absorbances indicated that Fe and Al values show significantly steadily decreasing values, suggesting that these elements are associated with particulates which are falling out of suspension. The values for Fe decreased by 50% for the tenth determination compared to the first determination whereas Al values decreased by 77%. To ensure that the ineffective mixing was not due to the pronounced V-shaped geometry of the TEFLON TM autosampler cups, several different styles of cups were evaluated. No cup style provided accurate analytical data with good precision with the prior art automated ultrasonic mixer.

COMPARATIVE EXAMPLE 3

A second test of the performance of the prior art device described in the previous example was conducted. The prior art automatic mixer was tested with samples which had been subjected to premixing (i.e. vortex or direct ultrasonic mixing) to determine if the prior art automatic mixer could maintain homogenity of the samples. In each instance, the continuous-mix feature of the prior art automatic ultrasonic mixer was used to agitate the samples. The first sub-sample was vortex mixed prior to placing a 1 milliliter-aliquot into an autosampler cup and was then continuously mixed with the prior art automatic ultrasonic mixer. The second sub-sample was initially mixed in the autosampler cup with an ultrasonic probe and was also continuously mixed with the prior art automatic ultrasonic mixer. A review of the integrated absorbencies for Al (obtained with the analysis techniques described above) shows a decrease from 0.32 to 0.19 absorbance.seconds for the ultrasonic probe-mixed sub-sample compared with a decrease from 0.33 to 0.09 absorbance.seconds for the sample which was only vortexed. Similar data were seen for Fe and Cr determined in this slurry preparation. These results indicate that this prior art automatic indirect ultrasonic mixer autosampler accessory does not provide either sufficient agitation or the highly advantageous results obtained with direct ultrasonic mixing.

I claim:

1. An apparatus comprising, ultrasonic probe means for imparting ultrasonic energy to a sample in order to mix said sample, analyzer means for analyzing said sample, and sample conveying means, operatively associated with said analyzer means and said ultrasonic probe means, for conveying said sample from direct contact with said ultrasonic probe means to said analyzer means.

2. An apparatus comprising, sample conveying means for conveying at least one sample, said sample conveying means including means providing electrical signals, ultrasonic probe means for direct insertion into, and ultrasonic mixing of, said at least one sample, and control means, electronically connected to said sample conveying means and ultrasonic probe means, for receiving said electrical signals from said sample conveying means and controlling said ultrasonic probe means in response to said electrical signals.

3. The apparatus of either claim 1 or 2 wherein said ultrasonic probe means is comprised of titanium.

4. The apparatus of either claim 1 or 2 further including a sample holding container, and wherein at least a portion of said ultrasonic probe means is positioned within said sample holding container.

5. The apparatus of claim 4 further including probe moving means connected to said ultrasonic probe means for inserting at least a portion of said ultrasonic probe means into said sample holding container and for removing said ultrasonic probe means from said sample holding container.

6. The apparatus of claim 5 wherein said probe moving means provides reciprocating movement of said ultrasonic probe means.

7. The apparatus of either claim 1 or 2 wherein said ultrasonic probe means defines either a stepped or tapered configuration.

8. The apparatus of either claim 1 or 2 wherein said sample conveying means is selected form the group consisting of a rotatable tray, or moveable belt.

9. The apparatus of claim 8 wherein said sample conveying means is a rotatable tray with operatively connected means to rotate said tray.

10. The apparatus of claim 2 further including analyzer means for analyzing a sample, said analyzer means being operatively associated with said sample conveying means, for receiving said at least one sample from said sample conveying means.

11. The apparatus of either claim 1 or 10 wherein said analyzer means is selected from the group consisting of atomic spectrometer analyzer means or molecular spectrometer analyzer means.

12. The apparatus of claim 11 wherein said analyzer means is selected from the group consisting of graphite furnace atomic emission spectrometer analyzer means and graphite furnace atomic absorption spectrometer analyzer means.

13. A process comprising, mixing a sample which is comprised of solid and liquid by imparting to said sample ultrasonic energy from an ultrasonic probe positioned directly in said sample, providing analyzer means for analyzing said sample, and analyzing said sample utilizing said analyzer means subsequent to said mixing.

14. A process comprising, mixing a sample by imparting to said sample ultrasonic vibration from an ultrasonic probe positioned directly in said sample, so as to produce a mixed sample, conveying said mixed sample utilizing conveying means which provides electrical signals, and controlling said mixing in response to said electrical signals.

15. The process of either claim 13 or 14 wherein said ultrasonic probe is comprised of titanium.

16. The process of either claim 13 or 14 wherein, said sample is contained within a sample holding container, and further including the steps of, moving at least a portion of said ultrasonic probe into said sample holding container, and removing said ultrasonic probe from said sample holding container.

17. The process of claim 16 wherein said steps of moving and removing said ultrasonic probe are accomplished by reciprocatory movement of said ultrasonic probe.

18. The process of either claim 13 or 14 wherein said ultrasonic probe defines either a stepped or tapered configuration.

19. The process of claim 14 further including conveying said mixed sample to an analyzer means, and analyzing said mixed sample.

20. The process of either claim 13 or 19 wherein said step of analyzing is selected from the group consisting of atomic spectrometer analyzing or molecular spectrometer analyzing.

21. The process of claim 20 wherein said step of analyzing is selected from the group consisting of graphite furnace atomic absorption spectrometer analyzing or graphite furnace atomic emission spectrometer analyzing.

* * * * *